United States Patent [19]

Arpadi

[11] Patent Number: 5,570,325
[45] Date of Patent: Oct. 29, 1996

[54] TOOTH BRUSHING TIMER

[76] Inventor: Harry S. Arpadi, 70 Frederick Pl., Mount Vernon, N.Y. 10552

[21] Appl. No.: 618,924

[22] Filed: Mar. 20, 1996

[51] Int. Cl.$^6$ .............................. G04B 47/00; G04F 1/04; B67D 1/07

[52] U.S. Cl. .............................. 368/10; 368/93; 368/108; 368/223; 222/192; 222/638; 434/263

[58] Field of Search ..................... 368/10, 93, 107–109, 368/223; 221/2, 3, 15; 222/192, 638; 434/215, 216, 263

[56] References Cited

U.S. PATENT DOCUMENTS

| | | |
|---|---|---|
| 1,973,390 | 9/1934 | Plants. |
| 2,926,487 | 3/1960 | Stone. |
| 3,021,666 | 2/1962 | Stone. |
| 3,783,364 | 1/1974 | Gallanis et al. |
| 3,998,234 | 12/1976 | Stubbmann. |
| 4,812,127 | 3/1989 | Hernandez. |
| 4,836,415 | 6/1989 | Grussmark. |
| 4,866,807 | 9/1989 | Kreit et al. |
| 4,991,755 | 2/1991 | Grusmark. |
| 5,184,959 | 2/1993 | Oryhon et al. |
| 5,259,086 | 11/1993 | Fong. |
| 5,438,726 | 8/1995 | Leite. |

Primary Examiner—Vit W. Miska
Attorney, Agent, or Firm—Ohlandt, Greeley, Ruggiero & Perle

[57] ABSTRACT

Tooth brushing timer device for presenting an amusing visual representation of the time required for a child to brush his or her teeth. The timer device comprises a housing, a static character face disposed at the front of the housing, and a visual indicator disposed behind the face. The face includes an aperture at the mouth region of the face so that a teeth portion of the visual indicator is visible through the aperture. The teeth portion of the visual indicator is capable of showing a white color for representing clean teeth and a non-white color, such as off-white or yellow, for representing non-clean teeth. Preferably, the visual indicator includes an hour glass timer, a liquid crystal display or a rotary timer. When the timer device is activated, the teeth portion animates a gradual transition from a non-white color to a white color for a predetermined period of time. In addition, the timer device may stand alone or include one or more compartments for bathroom amenities.

18 Claims, 6 Drawing Sheets

TOOTH BRUSHING TIMER

The present invention relates generally to devices used to induce a child to brush his or her teeth for a predetermined period of time. More particularly, the present invention relates to a timer device for presenting an amusing visual representation of the time required for a child to brush his or her teeth. The timer device effectively guides the child to brush his or her teeth for an appropriate length of time in order to ensure proper care of the child's dental hygiene.

BACKGROUND OF THE INVENTION

Toothbrush holders that provide an incentive for small children to brush their teeth for a predetermined period of time are known in the art. These prior art toothbrush holders have the face of an animal or character shown at the front of a box and a hand holding a small toothbrush on one side of the face. The hand moves the toothbrush over a mouth portion of the face to animate the act of brushing one's teeth. Also, these devices are activated by removing the toothbrush from a receptacle or shifting the position of a control tab, and deactivated automatically after a predetermined time period has lapsed. For example, U.S. Pat. No. 2,926,487 to W. V. Stone, which issued on Mar. 1, 1960, U.S. Pat. No. 3,021,666 to W. V. Stone, which issued on Feb. 20, 1962, and U.S. Pat. No. 3,998,234 to A. Stubbmann, which issued on Dec. 21, 1976, provide various toothbrush holders having visual displays for animating the operation of brushing one's teeth. In particular, a stationary representation of a character's face, prominently displaying its teeth, is provided with a dynamic representation of a miniature toothbrush that moves back and forth over the character's teeth. These toothbrush holders include a timer for terminating the animated operation after a predetermined time period has expired. The tooth brushing operation is animated for a predetermined period of time to indicate to a child the proper period of time for brushing his or her teeth.

In addition, teeth brushing-related products having a timer device to indicate a time period of sufficient brushing time are also known in the art. For example, U.S. Pat. No. 4,836,415 to S. M. Grusmark, which issued on Jun. 6, 1989, and U.S. Pat. No. 4,991,755 also to S. M. Grusmark, which issued on Feb. 12, 1991, provide various timers mounted on a toothpaste dispenser. U.S. Pat. No. 4,836,415 discloses an hour glass timer containing sand to track the amount of brushing time.

The devices disclosed in the above-mentioned patents do not, however, provide an effective means for inducing a child to brush his or her teeth for a reasonable period of time. That is, none of the above patents provide a timing mechanism that includes an amusing or entertaining visual display that captures the attention of the user, particularly a child, while providing continual feedback to the user about the time remaining for brushing his or her teeth. One problem is that the repetitive motion of moving a toothbrush back and forth over a character's teeth can lose the attention of the child, particularly a very young child. Also, a simple hour glass generally does not capture the attention of a child. Another problem is that the child's mind begins to wander during tooth brushing operation since the time remaining is unknown to the child.

Accordingly, the present invention is directed to a tooth brushing timer device which is capable of presenting an amusing visual representation of the time required for a child to brush his or her teeth. The timer device captures the attention of the user by providing an entertaining face having color-changing teeth in which the teeth change between two distinct colors. When the timer device is activated, the teeth gradually transform from, for example, a non-white color to white over a predetermined period of time. Such a novel device continuously provides the user with visual feedback relating to the time period for brushing his or her teeth. In particular, the ratio of the two colors covering the teeth is proportionate to the ratio of the time expired and time remaining for the tooth brushing operation. Thus, by knowing the time remaining for the tooth brushing operation, the child may pace themselves for brushing each portion of their mouth and anxiously anticipate the moment when the tooth brushing operation will end.

SUMMARY OF THE INVENTION

The present invention is a tooth brushing timer device for dynamic, visual indication of time progression while a user brushes his or her teeth which, in brief summary, comprises a housing having a front surface, a static facial representation of an animated character disposed on the from surface of the housing, and a timing-based indicator disposed on one side of the facial representation. The facial representation has an aperture for displaying a particular image therethrough (e.g., the mouth of the animated character, and the timing-based indicator includes a dynamic teeth representation exposed through the aperture of the facial representation that has a first color for representing non-clean teeth and a second color for representing clean teeth. The timing-based indicator provides a gradual kinetic transition of the teeth representation from the first color to the second color for a predetermined period of time.

Preferably, the first color is darker than the second color and, more preferably, the first color is a non-white color and the second color is white. In addition, the housing may include one or more compartments for holding bathroom amenities and/or a support stand disposed on a back surface opposite the front surface of the housing for supporting the housing at a substantially upright position.

For first and second embodiments of the timer device, the timing-based indicator is an hour glass timer having a first container with sand therein, a second container and a constricted neck connecting the first and second containers to allow the sand to pass from the first container to the second container. The hour glass timer has a first position for displaying the first container through the aperture of the facial representation and a second position for displaying the second container through the aperture of the facial representation as the sand passes from the first container to the second container for the predetermined period of time.

Also, the timing-based indicator includes a background image disposed adjacent to the hour glass timer opposite the aperture of the facial representation. The particular image displayed through the aperture includes an obstructed view and an unobstructed view so that the obstructed view displays the sand through the aperture and the unobstructed view displays the background image through the aperture. Further, the hour glass timer includes a handle disposed on the facial representation for rotating the hour glass timer between the first position and the second position.

For third and fourth embodiments of the timer device, the teeth representation is a liquid crystal display ("LCD") having a first dark color for representing non-clean teeth and a second light color for representing clean teeth. The timing-based indicator includes a control circuit for monitoring the predetermined period of time and controlling the gradual kinetic transition of the teeth representation. The timing-based indicator also includes a button disposed on the facial representation for initiating the predetermined period of time and the gradual kinetic transition of the teeth representation. In addition, the viewing area of the LCD may be partitioned into a plurality of distinct sections.

The LCD is initially the first color at the beginning of the predetermined period of time and an increasing portion of the LCD gradually changes from the first color to the second color throughout the predetermined period of time so that the LCD is the second color at the end of the predetermined period of time. Preferably, the LCD has a top portion and a bottom portion and the LCD gradually changes color from the top portion to the bottom portion over the predetermined period of time.

For the fifth embodiment of the timer device, the timing-based indicator is a rotary timer that includes a rotating platter having a center portion disposed on a front portion of the timing-based indicator. The rotating platter includes a first peripheral surface section having the first color that represents non-clean teeth and a second peripheral surface section having the second color that represents clean teeth. The rotary timer has a first position for displaying the first peripheral surface section through the aperture of the facial representation and a second position for displaying the second peripheral surface section through the aperture of the facial representation as the rotating platter rotates about the center portion for the predetermined period of time. In addition, the rotary timer includes a handle disposed at the center portion for initiating the predetermined period of time and rotably returning the rotating platter to the first position.

DETAILED DESCRIPTION OF THE PREFERRED EMBODIMENTS

Figure 1:
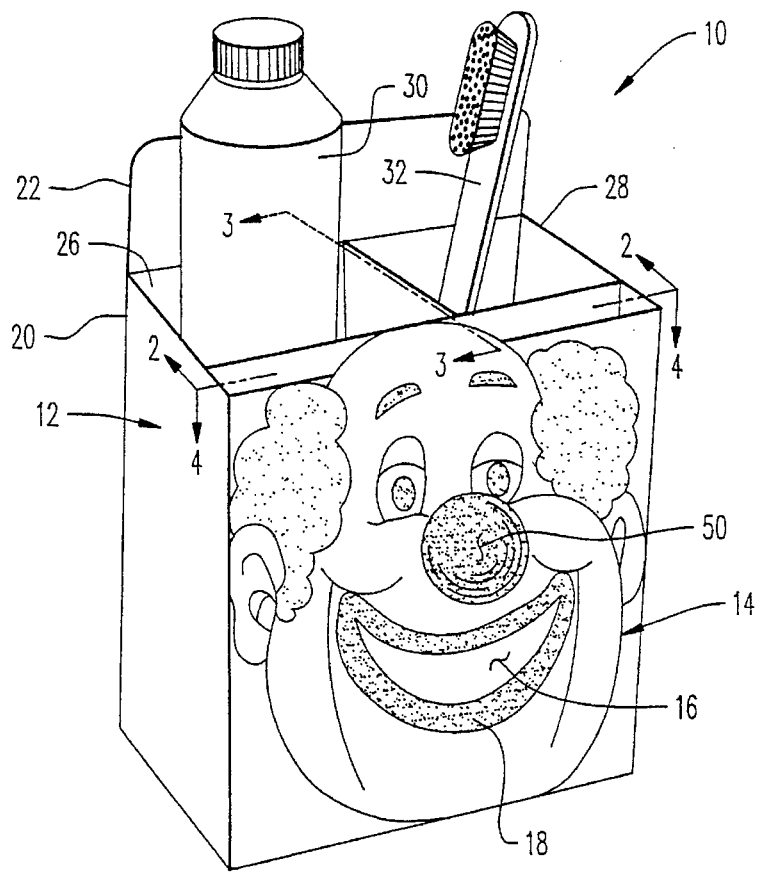
FIG. 1 is a perspective view of a first preferred embodiment of the tooth brushing timer device of the present invention having an hour glass timer.

Referring to the drawings, in general, the present invention is a tooth brushing timer device for providing a visual indication of time progression to a user while that user brushes his or her teeth. Numerous embodiments of the timer device are described below and shown in the drawings. The timer device includes a housing having a picture or sculpture of a face displayed at the front of the housing. The mouth region of the face gradually changes color throughout the time that the user brushes his or her teeth. Initially, all areas of the mouth region are a single non-white color to represent non-clean teeth. When the predetermined tooth brushing time period begins, an increasing portion of the mouth region changes from the non-white color to a substantially white color so that, at the end of the time period, all areas of the mouth region are the substantially white color covers the entire mouth region.

Referring to FIG. 1, there is provided a first preferred embodiment of the timer device which is generally represented by reference numeral 10. Timer device 10 comprises a housing 12, a front facial representation 14 of a human or animal face, and a teeth representation 16 that is exposed through an aperture or mouth portion 18 of facial representation 14. Facial representation 14 may be a two-dimensional picture or a three-dimensional mask is attached to a front surface of housing 12. Housing 12 includes a front surface for attaching facial representation 14 thereto and a tab 22 extending from a back surface 20 for displaying product and/or sales information. Also, housing 12 includes a front compartment 24 for housing a timing based indicator, and two back compartments (26, 28) for receiving bathroom amenities. For the first preferred embodiment, the timing based indicator is an hour glass timer as described below. As shown in FIG. 1, back compartments (26, 28) store a toothpaste tube 30 and a toothbrush 32, respectively. In addition to storing bathroom amenities, back compartments (26, 28) provide sufficient back support to front compartment 24 to support the timing device 10 in a substantially upright position.

Figure 2:
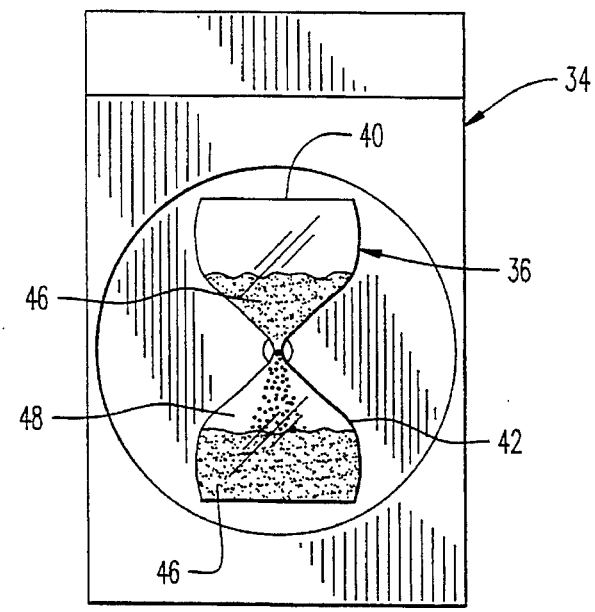
FIG. 2 is a front cross-sectional view of the timer device along line 2—2 of FIG. 1 in which the front facial representation has been omitted.
Figure 3:
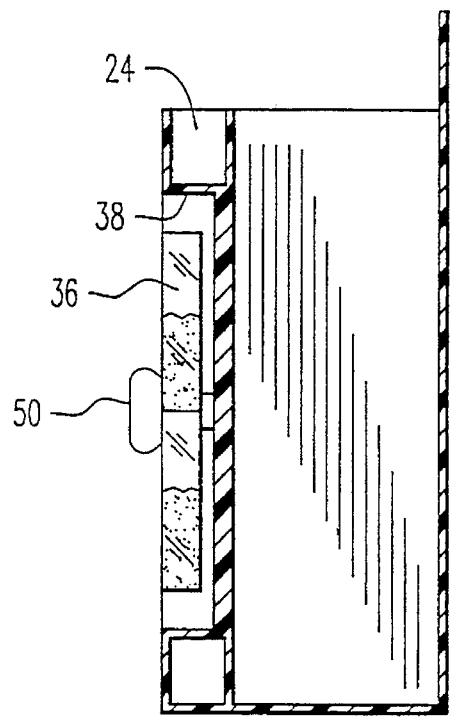
FIG. 3 is a side cross-sectional view of the timer device along line 3—3 of FIG. 1 in which the front facial representation has been omitted.
Figure 4:
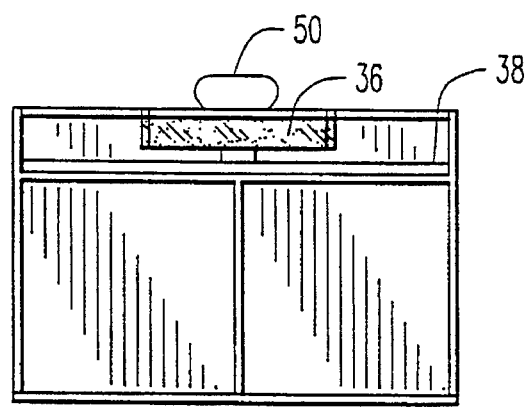
FIG. 4 is a top cross-sectional view of the timer device along line 4—4 of FIG. 1 in which the front facial representation has been omitted.

Referring to FIGS. 2 through 4, the first preferred embodiment of timer device 10 has a timing based indicator that is an hour glass timer 34. For FIGS. 2 through 4, facial representation 14 and bathroom amenities (30, 32) have been omitted in order to more clearly show the hour glass timer 34.

Referring specifically to FIG. 2 in conjunction with FIG. 1, hour glass timer 34 comprises an hour glass 36 supported for rotation within a stationary compartment 38. Hour glass 36 includes two oppositely disposed containers (40, 42), namely first container 40 and second container 42, having a constricted neck 44 therebetween. Sand 46 is disposed in hour glass 36 which passes from one container to the other container through constricted neck 44. Mouth portion 18 of facial representation 14 (shown in FIG. 1) is positioned in front of either first container 40 or second container 42, whichever is positioned at the lower section of stationary compartment 38. The container, either first container 40 or second container 42, positioned at the lower section of stationary compartment 38 shall hereinafter be referred to as the lower container. For example, referring to FIG. 2, the lower container is second container 42 and mouth portion 18 would be positioned in front of second container 42.

In addition, stationary compartment 38 has a background color that contrasts with the color of sand 48 so that sand 48 and the background color of stationary compartment 38 may be easily distinguished by anyone viewing hours glass timer 34 through mouth portion 18 of facial representation 14. In the alternative, the contrasting background color may be provided on the back side of first container 40 and second container 42. For the first preferred embodiment, the color of sand 46 is much lighter than the background color of stationary compartment 38. Preferably, sand 46 is substantially white whereas the background color of stationary compartment 38 is a non-white color, such as yellow or black.

Hour glass 36 has a first position in which second container 42 is above first container 40 and a second position, shown in FIG. 2, in which first container 40 is above second container 42. By rotating hour glass 36 between the first position and the second position, sand 48 may be transported back and forth between the two containers (40, 42). For example, as shown in FIG. 2, sand 48 flows from first container 40 to second container 42 after hour glass 36 has been rotated from the first position to the second position.

It is important to note that the background color of stationary compartment 38 will show through mouth portion 18 of facial representation 14 when hour glass 36 is initially rotated from one position to another. As time passes, sand 46 will fill-in the lower compartment and, thus, the lighter color of sand 46 will begin to appear through mouth portion 18. The predetermined period of time for the tooth brushing operation using the first preferred embodiment is determined by the length of time that it takes for sand 46 to pass from one compartment to the other. Thus, at the end of the predetermined period of time, sand 46 will have filled the lower compartment and mouth portion 18 will have gradually changed from a non-white color to a white color.

Referring to FIGS. 3 and 4, hour glass timer 34 includes a handle 50 disposed at the middle of hour glass 36, in front of constricted neck 44. Hour glass 36 is rotating between the first position and the second position by rotating handle 50. For the preferred embodiment, handle 50 is the nose of facial representation 14 shown in FIG. 1. It should also be noted that hour glass 36 has a generally planar shape to conserve space within timer device 10. As shown in FIGS. 3 and 4, hour glass 36 has two oppositely disposed flat sides that are a fixed, narrow distance from each other so that the depth of housing 12 is not unduly large.

A second preferred embodiment is similar to timer device 10 shown in the first preferred embodiment of FIG. 1 but does not include compartments (26, 28) for storing bathroom amenities.

Figure 5:
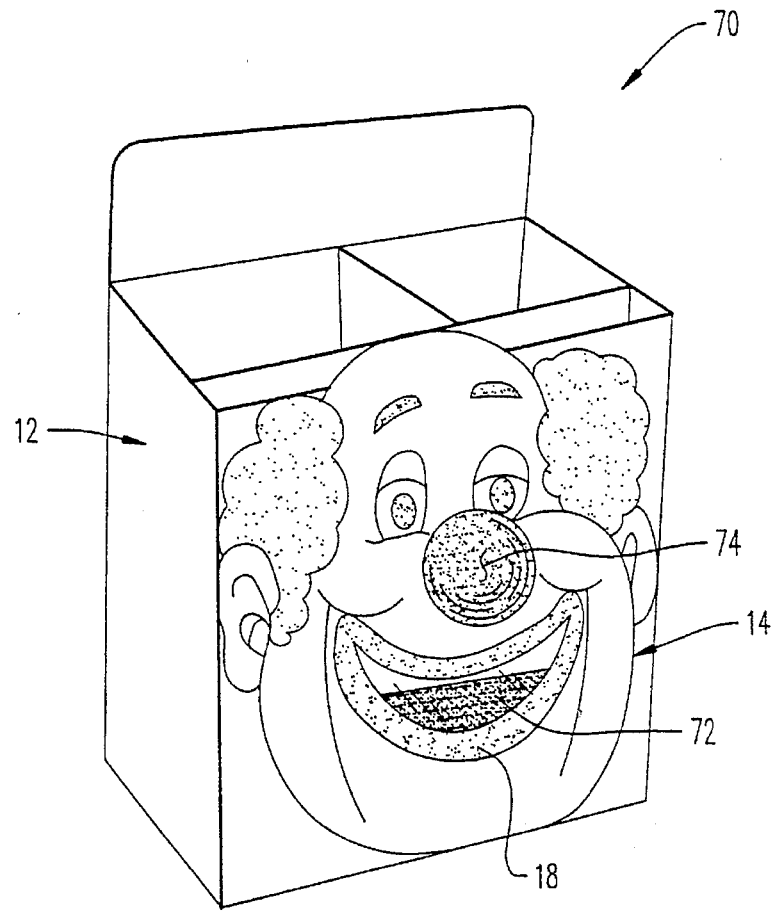
FIG. 5 is a front, left side perspective view of another preferred embodiment of the tooth brushing timer device of the present invention having a liquid crystal display ("LCD")
Figure 6:
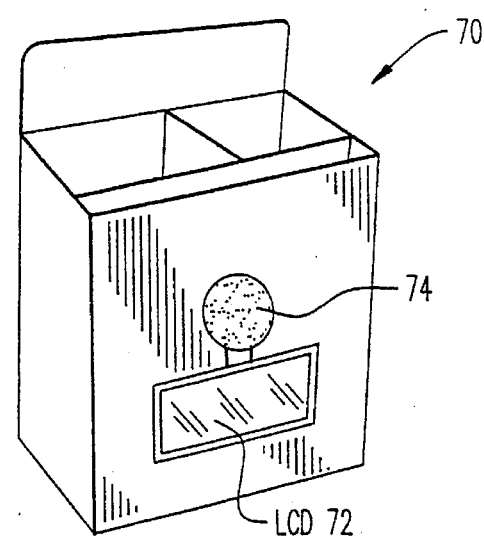
FIG. 6 is a front, left side perspective view of the timer device housing of the embodiment of FIG. 5 in which the front facial representation has been omitted.

Referring to FIGS. 5 and 6, a tooth brushing timer device 70 of a third preferred embodiment includes a timing based indicator having a liquid crystal display ("LCD") 72 exposed through mouth portion 18 of facial representation 14. LCD 72 is a display made of material whose reflectance and transmittance changes when an electric filed is applied. For the third preferred embodiment, LCD 72 is a two-color display that has a darker color for representing non-clean teeth and a lighter color for representing clean teeth. The timing-based indicator also includes a button 74 disposed on facial representation 14, as a nose, for initiating the predetermined period of time for performing the tooth brushing operation. Button 74 further includes a control circuit for monitoring the predetermined period of time and controlling the gradual kinetic transition of LCD 72 from the darker color to the lighter color.

One advantage of using a timing based indicator having a LCD is that such indicator does not require much room and the depth of the timing based indicator may be significantly reduced. As shown in FIG. 6, LCD 72 and its associated components, including button 74, simply attach to the front of housing 12 and do not require their own compartment.

Figure 7A:
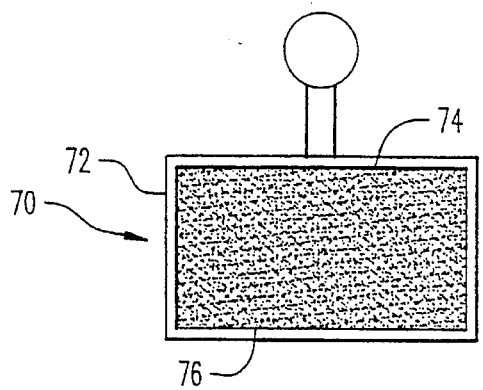
FIGS. 7A through 7D are front elevational views of the LCD of the timer device of FIG. 6 depicting the gradual change of color of the display during operation of the timer device.
Figure 7D:
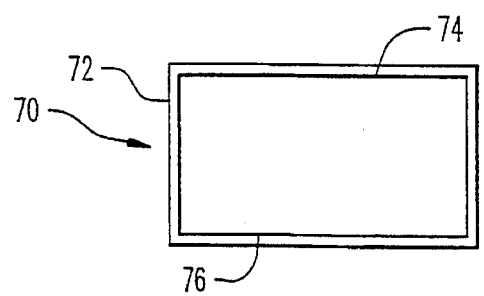

Referring to FIGS. 7A through 7D, LCD 72 of the third preferred embodiment gradually changes from the darker color to the lighter color during operation of timer device 70. As shown in FIG. 7A, LCD 72 initially begins as the darker color at the beginning of said predetermined period of time. Then, referring to FIGS. 7B and 7C, an increasing portion of LCD 72 gradually changes from the darker color to the lighter color throughout the predetermined period of time. Thus, by the end of the predetermined period of time, LCD 72 becomes the lighter color as shown in FIG. 7D. For the third preferred embodiment, LCD 72 gradually changes color from a top portion 74 to a bottom portion 76 over the predetermined period of time.

Figure 8A:
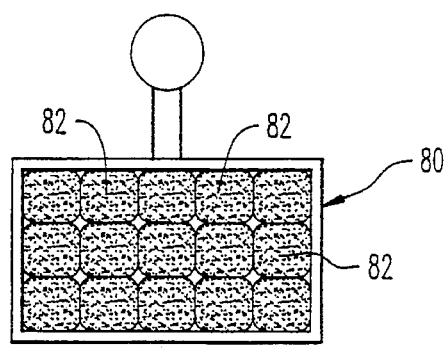
FIGS. 8A through 8D are a front elevational views of the LCD of another embodiment of the timer device of the present invention that is similar to the embodiment of FIGS. 5, 6 and 7A through 7D but having a different LCD.
Figure 7B:
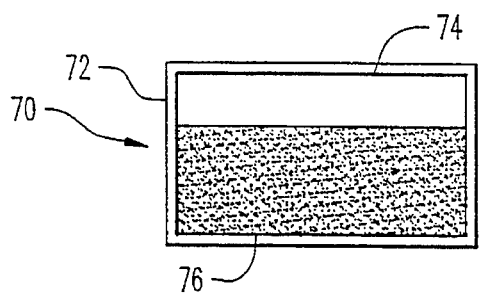
Figure 8B:
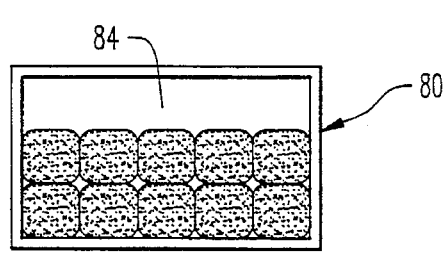
Figure 7C:
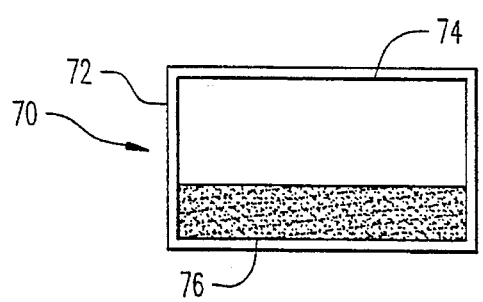
Figure 8C:
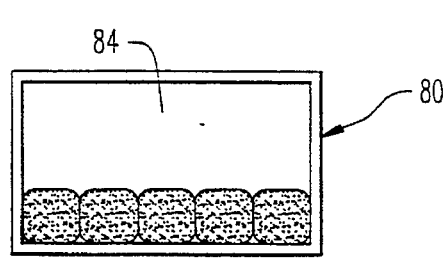
Figure 8D:
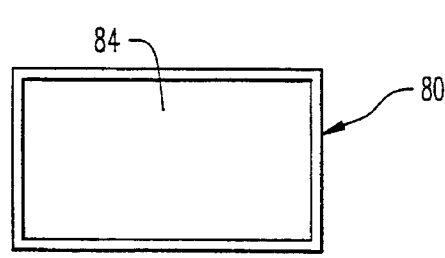

Referring to FIGS. 8A through 8D, a tooth brushing timer device of a fourth preferred embodiment is similar to the timer device 70 of the third preferred embodiment but includes a different type of LCD. In particular, LCD 80 is partitioned into a plurality of distinct dark sections 82 so that a user may easily gauge the amount of time remaining for the predetermined period of time. In addition, such partitioning of LCD 80 may represent rows of teeth to add further aesthetic features to facial representation 14. As shown in FIG. 8A, LCD 80 initially begins as a plurality of dark sections 82 covering the entire screen. Then, as shown in FIGS. 8B and 8C, an increasing number of dark sections 82 of LCD 80 gradually begin to appear to form a lighter color region 84. LCD 72 becomes the lighter color by the end of the predetermined period of time as shown in FIG. 8D. Similar to the third preferred embodiment, LCD 80 of the third preferred embodiment gradually changes color from top-to-bottom over the predetermined period of time.

Figure 9:
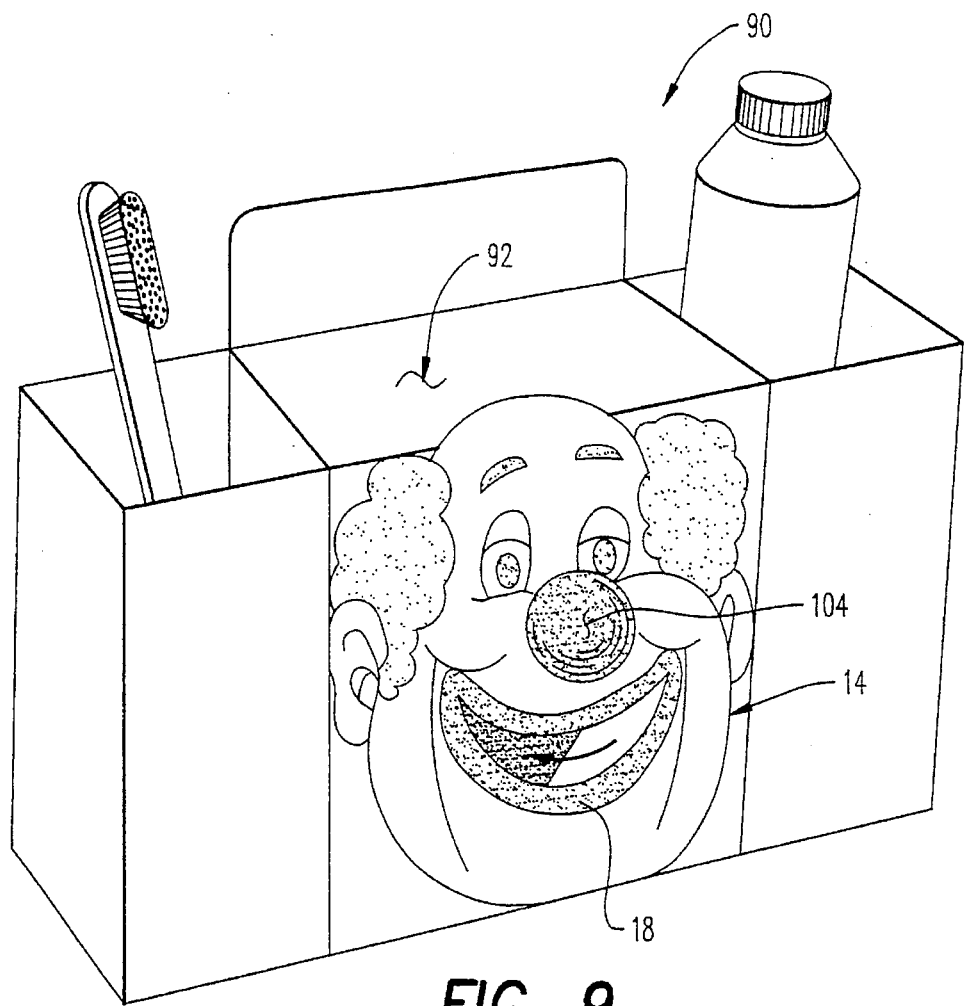
FIG. 9 is a perspective view of another embodiment of the tooth brushing timer device of the present invention having a rotary timer.
Figure 10:
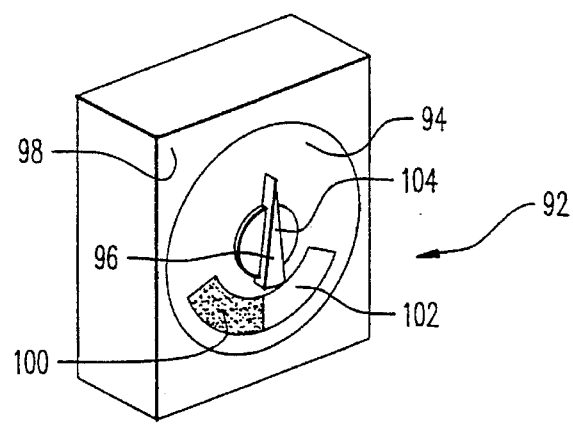
FIG. 10 is a perspective view of the timer device housing of the embodiment of FIG. 9 in which the front facial representation has been omitted.

Referring to FIGS. 9 and 10, a tooth brushing timer device 90 of a fitch preferred embodiment includes a timing based indicator having a rotary timer 92. Rotary timer 92 includes a rotating platter 94 having a center portion 96 disposed on a front portion 98 of rotary timer 92. Rotating platter 94 has a first section 100 and a second section 102 disposed on an outer periphery of the platter's front surface. First section 100 has a non-white color that represents non-clean teeth, and second section 102 has a substantially white color that represents clean teeth. Rotary timer 92 includes a handle 104 disposed at center portion 96 for timing the predetermined period of time for the tooth brushing operation.

To start the predetermined period of time for the tooth brushing operation, rotating platter 94 is positioned at its initial position by turning handle 104 counter clockwise. At this initial position, first section 100 which has the non-white color appears through mouth portion 18 of facial representation 14. Then, by releasing handle 104, rotating platter 94 slowly returns to its ending position throughout the predetermined period of time. As rotating platter 94 turns clockwise, first section 100 gradually shifts away from mouth portion 18 and second section 102 which has the white color gradually towards mouth portion 18. At the end of the predetermined period of time, only the second section 102 will appear through mouth portion 18.

The fifth preferred embodiment also differs from the other embodiments described above by positioning compartments for bathroom amenities to the sides of the timing based indicator, namely the rotary timer 92, instead of behind the indicator. Such positioning of compartments provides sufficient support to maintain timing device 90 in a substantially upright position while minimizing the depth of the device.

The present invention has a wide variety of applications and is not limited to the tooth brushing timers described above. The present invention may be used for any type of device that provides an amusing or entertaining visual display to capture the attention of the user, particularly a child, and motivate or guide the person, particularly a child, to carryout a particular task. For example, when a child is having a tantrum, parents often isolate the child for a particular time period that commonly referred to as a "time-out" period. For such situation, the present invention may be a device that is placed near the child to help change his or her mood and make the time-out period pass quicker.

Figure 11:
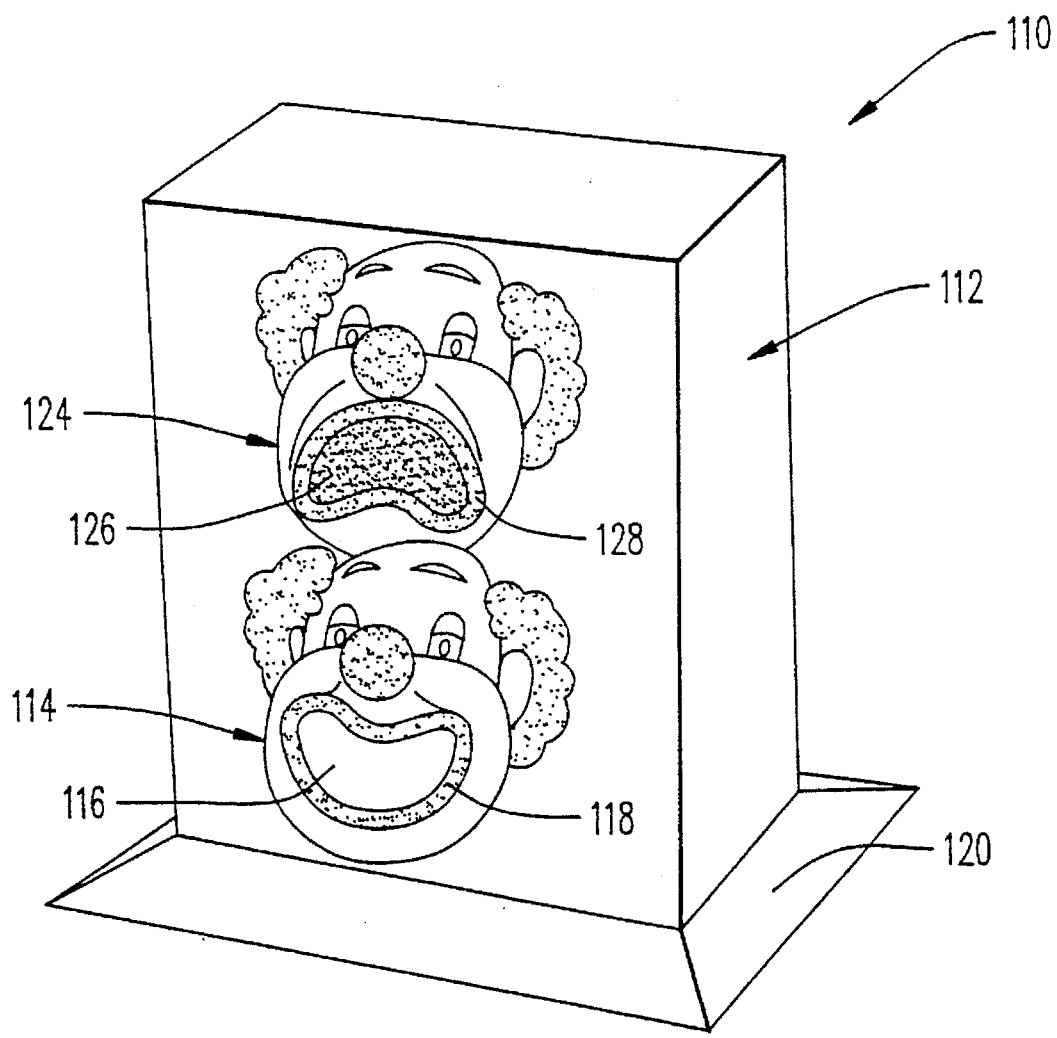
FIG. 11 is a perspective view of an alternative embodiment of the present invention.

Referring to FIG. 11, there is provided an alternative embodiment of the present invention, namely a time-out timer device 110, that captures the attention of a child who is having a temper-tantrum. Time-out timer device 110 comprises a housing 112, a pair of front facial representations (114, 124) and a pair of mouth portions (118, 128) corresponding to facial representations (114, 124). Housing 112 includes a base 120 for supporting housing 112 in a substantially upright position, and mouth portion 128 is located above mouth portion 118. A pair of respective teeth representations 116 and 126 that are exposed through mouth portions 118 and 128, respectively.

For this alternative embodiment, the timing based indicator is an hour glass timer 136 similar to that of the above first preferred embodiment. Hour glass 136 rotates between a first position and a second position so that sand contained therein may be transported from one container of hour glass 136 to an oppositely disposed container of hour glass 136. Thus, for the first or second positions, one container is positioned behind mouth portion 118 and the other container is positioned behind mouth portion 128.

During operation, the sand will initially show through mouth portion 128. As time passes, the sand will begin to disappear from mouth portion 128 and reappear at mouth portion 118. At the end of the predetermined period of time, the sand will show through mouth portion 118 instead of mouth portion 128. Throughout the predetermined period of time, mouth portion 128 of the upper facial representation 124 will have gradually changed from a white color to a non-white color and, analogously, mouth portion 118 of the lower facial representation 114 will have gradually changed from a non-white color to a white color. Accordingly, time-out timer device 110 provides an amusing or entertaining visual display that captures the attention of the child in order to make the time-out period pass quickly and help change the child's mood.

The invention having been thus described with particular reference to the preferred forms thereof, it will be obvious that various changes and modifications may be made therein without departing from the spirit and scope of the invention as defined in the appended claims.

What is claimed is:

1. A timer device for providing a dynamic, visual indication of time progression while a user brushes his or her teeth, the timer comprising:

a housing having a front surface;

a static facial representation of a particular character disposed on said front surface of said housing, said facial representation having an aperture for displaying a particular image therethrough; and a timing-based indicator disposed on one side of said facial representation having a dynamic smile representation exposed through said aperture of said facial representation, said smile representation of said timing-based indicator having a first color for representing non-clean teeth and a second color for representing clean teeth, wherein said timing-based indicator provides a gradual kinetic transition of said smile representation from said first color to said second color for a predetermined period of time.

2. The timer device of claim 1, wherein said first color is darker than said second color.

3. The timer device of claim 2, wherein said second color is a white color and said first color is a non-white color.

4. The timer device of claim 1, wherein said housing includes at least one compartment for holding a bathroom amenity.

5. The timer device of claim 1, further comprising a support stand disposed on a back surface opposite said from surface for supporting said housing at a substantially upright position.

6. The timer device of claim 1, wherein said timing-based indicator is an hour glass timer having a first container with sand therein, a second container and a constricted neck connecting said first and second containers to allow said sand to pass from said first container to said second container.

7. The timer device of claim 6, wherein said hour glass timer has a first position for displaying said first container through said aperture of said facial representation and a second position for displaying said second container through said aperture of said facial representation as said sand passes from said first container to said second container for said predetermined period of time.

8. The timer device of claim 7, wherein:

said timing-based indicator includes a background image disposed adjacent to said hour glass timer opposite said aperture of said facial representation;

said particular image displayed through said aperture includes an obstructed view and an unobstructed view; and said obstructed view displays said sand through said aperture and said unobstructed view displays said background image through said aperture.

9. The timer device of claim 7, wherein said hour glass timer includes a handle disposed on said facial representation for rotating said hour glass timer between said first position and said second position.

10. The timer device of claim 1, wherein said smile representation is a liquid crystal display having a first dark color for representing non-clean teeth and a second light color for representing clean teeth.

11. The timer device of claim 10, wherein said timing-based indicator includes a control circuit for monitoring said predetermined period of time and controlling said gradual kinetic transition of said smile representation.

12. The timer device of claim 10, wherein a viewing area of said liquid crystal display is partitioned into a plurality of distinct sections.

13. The timer device of claim 10, wherein said liquid crystal display is initially said first color at the beginning of said predetermined period of time and an increasing portion of said liquid crystal display gradually changes from said first color to said second color throughout said predetermined period of time so that said liquid crystal display is said second color at the end of said predetermined period of time.

14. The timer device of claim 10, wherein said liquid crystal display has a top portion and a bottom portion and said liquid crystal display gradually changes color from said top portion to said bottom portion over said predetermined period of time.

15. The time device of claim 10, wherein said timing-based indicator includes a button disposed on said facial representation for initiating said predetermined period of time and said continuous kinetic transition of said smile representation.

16. The timer device of claim 1, wherein:

said timing-based indicator is a rotary timer that includes a rotating platter having a center portion disposed on a front portion of said timing-based indicator;

said rotating platter includes a first peripheral surface section having said first color that represents non-clean teeth and a second peripheral surface section having said second color that represents clean teeth.

17. The timer device of claim 16, wherein said rotary timer has a first position for displaying said first peripheral surface section through said aperture of said facial representation and a second position for displaying said second peripheral surface section through said aperture of said facial representation as said rotating platter rotates about said center portion for said predetermined period of time.

18. The timer device of claim 17, wherein said rotary timer includes a handle disposed at said center portion for initiating said predetermined period of time and rotably returning said rotating platter to said first position.

\* \* \* \* \*